(12) United States Patent
Grutzmacher et al.

(10) Patent No.: US 11,337,067 B2
(45) Date of Patent: May 17, 2022

(54) SYSTEMS AND METHODS FOR PROVIDING WIRELESS ACCESS SECURITY BY INTERROGATION

(71) Applicant: 802 Secure, Inc., Pleasanton, CA (US)

(72) Inventors: Konrad Grutzmacher, Berkeley, CA (US); Clifford Fernandez, Huntington Beach, CA (US); Michael Raggo, Auburn, GA (US); Garry Drummond, Pleasanton, CA (US)

(73) Assignee: 802 Secure, Inc., Pleasanton, CA (US)

( * ) Notice: Subject to any disclaimer, the term of this patent is extended or adjusted under 35 U.S.C. 154(b) by 0 days.

(21) Appl. No.: 16/928,944

(22) Filed: Jul. 14, 2020

(65) Prior Publication Data

US 2020/0344609 A1 Oct. 29, 2020

Related U.S. Application Data

(63) Continuation of application No. 15/877,274, filed on Jan. 22, 2018, now Pat. No. 10,764,755.
(Continued)

(51) Int. Cl.
*H04W 12/08* (2021.01)
*H04L 29/06* (2006.01)
(Continued)

(52) U.S. Cl.
CPC ......... *H04W 12/08* (2013.01); *H04L 63/0876* (2013.01); *H04L 63/1441* (2013.01);
(Continued)

(58) Field of Classification Search
CPC ..... H04W 12/08; H04W 12/12; H04W 12/06; H04L 63/1441; H04L 63/20; H04L 63/0876; H04L 63/162; H04L 2209/80
See application file for complete search history.

(56) References Cited

U.S. PATENT DOCUMENTS 9,219,754 B2 12/2015 French et al.
9,246,943 B2 1/2016 French et al.
(Continued)

FOREIGN PATENT DOCUMENTS

WO WO-2017/001022 1/2017

OTHER PUBLICATIONS

Holz et al., Detecting honeypots and other suspicious environments, Jun. 2005, Proceedings from the Sixth Annual IEEE SMC Information Assurance Workshop, pp. 29-36 (Year: 2005).*
(Continued)

*Primary Examiner* — Kenneth W Chang
(74) *Attorney, Agent, or Firm* — Womble Bond Dickinson (US) LLP

(57) ABSTRACT

Security is provided for enterprise local area networks (LANs) by pre-vetting and identifying the security characteristic and actions of any new wireless networks that tries to connect to a secure LAN network. The disclosure herein provides for identification and classification of IEEE 802.11 wireless networks by using monitoring sensor system within and managed by a centralized cloud. The monitoring sensors interrogate the network mimicking the behavior of known platforms, such as an end-user's workstation or mobile device followed by random actions simulating a human person. The response characteristics of the wireless network including the behavior patterns relating to the LAN system and human behavior are collected. The security system uses methods of classification provided through analysis of the collected information using methods including data science approaches, correlation analysis, and machine learning classification methods to determine the security classification of the newly detected wireless network.

20 Claims, 7 Drawing Sheets

Related U.S. Application Data

(60) Provisional application No. 62/555,586, filed on Sep. 7, 2017.

(51) Int. Cl.
*H04W 12/12* (2021.01)
*H04W 12/06* (2021.01)

(52) U.S. Cl.
CPC ............. *H04L 63/20* (2013.01); *H04W 12/06* (2013.01); *H04W 12/12* (2013.01); *H04L 63/162* (2013.01); *H04L 2209/80* (2013.01)

(56) References Cited

U.S. PATENT DOCUMENTS

| | | | |
|---|---|---|---|
| 9,363,675 | B2 | 6/2016 | Chuang et al. |
| 9,426,653 | B2 | 8/2016 | Becker et al. |
| 9,479,357 | B1 | 10/2016 | Fu et al. |
| 9,572,034 | B1 | 2/2017 | Lu |
| 9,596,604 | B2 | 3/2017 | Shinde et al. |
| 9,622,081 | B1 | 4/2017 | Satish |
| 9,667,659 | B2 | 5/2017 | French et al. |
| 9,681,304 | B2 | 6/2017 | Clark et al. |
| 2002/0184528 | A1 | 12/2002 | Shevenell et al. |
| 2003/0182582 | A1 | 9/2003 | Park et al. |
| 2006/0193284 | A1 | 8/2006 | Stieglitz et al. |
| 2007/0286143 | A1* | 12/2007 | Olson ............... H04W 12/12 370/338 |
| 2007/0291945 | A1 | 12/2007 | Chuang et al. |
| 2011/0247072 | A1* | 10/2011 | Staniford ............. G06F 21/566 726/24 |
| 2011/0314147 | A1* | 12/2011 | Whelan ............. H04L 63/1466 709/224 |
| 2014/0096229 | A1* | 4/2014 | Burns ................ H04L 63/1491 726/15 |
| 2014/0115706 | A1 | 4/2014 | Silva et al. |
| 2014/0157364 | A1 | 6/2014 | Lee et al. |
| 2014/0259124 | A1 | 9/2014 | Petersen et al. |
| 2014/0310763 | A1 | 10/2014 | French et al. |
| 2014/0366086 | A1 | 12/2014 | French et al. |
| 2015/0024710 | A1 | 1/2015 | Becker |
| 2015/0031332 | A1 | 1/2015 | Clark et al. |
| 2015/0295948 | A1 | 10/2015 | Hassell et al. |
| 2015/0373538 | A1 | 12/2015 | Huang et al. |
| 2016/0014607 | A1 | 1/2016 | Shinde et al. |
| 2016/0044113 | A1 | 2/2016 | Marmolejo-Meillon et al. |
| 2016/0072849 | A1 | 3/2016 | French et al. |
| 2016/0094992 | A1 | 3/2016 | Sun et al. |
| 2016/0105802 | A1* | 4/2016 | Sauder ................ H04Q 3/0025 455/410 |
| 2016/0119316 | A1 | 4/2016 | Liu |
| 2016/0277427 | A1* | 9/2016 | Deshpande ......... H04W 12/122 |
| 2016/0307170 | A1 | 10/2016 | Harkey et al. |
| 2016/0308837 | A1 | 10/2016 | Baliga et al. |
| 2017/0064590 | A1 | 3/2017 | Blankenship et al. |
| 2017/0214708 | A1 | 7/2017 | Gukal et al. |
| 2017/0223037 | A1 | 8/2017 | Singh et al. |
| 2017/0310705 | A1 | 10/2017 | Gopalakrishna et al. |
| 2018/0124093 | A1* | 5/2018 | Schwartz ............. H04W 12/12 |

OTHER PUBLICATIONS

"International Search Report and Written Opinion of the International Searching Authority dated Oct. 17, 2018; International Application No. PCT/US2018/047600", Oct. 17, 2018.

Lu, Kun-Yung, "A Data Simulator for ZigBee-base Wireless Sensor Network System", IEEE 10th International Conference on Trust, Security and Privacy in Computing and Communications, Nov. 2011, pp. 1699-1703 (2011).

Extended European Search Report dated Apr. 6, 2021, consisting of Supplementary European Search Report and European Search Opinion; European Patent Application No. 18854355.7; 11 pages total.

* cited by examiner

SYSTEMS AND METHODS FOR PROVIDING WIRELESS ACCESS SECURITY BY INTERROGATION

CROSS REFERENCE TO RELATED APPLICATIONS

This application is a continuation of U.S. patent application Ser. No. 15/877,274 filed on Jan. 22, 2018, which claims the benefit of U.S. Provisional Application No. 62/555,586 filed on Sep. 7, 2017, the disclosures of which are incorporated by reference herein.

TECHNICAL FIELD

This disclosure relates to the field of secure connection of wireless networks, and more specifically to identifying the behavioral characteristics of wireless networks relating to security of the wireless networks requesting access to a secure local area networks (LAN).

BACKGROUND

In most local area networks (LAN)s, there is typically continuous removal and entry of new devices, and networks. Even if the LAN had been secured from any intrusions and attacks from outside, the new devices and networks that connect to the LAN need not be secure and may provide a path-way for security breaches and cyber-attacks. Currently the IEEE 802.11i and the Extensible Authentication Protocol (EAP) methods from the internet engineering task force (IETF) for wireless networks are the two standards that support secure wireless LAN deployments. These when implemented are expected to provide protection from security breaches and cyber-attacks on the secure WLANs that conform to 802.11 group of wireless networks. The two current security methods under 802.11i and EAP for WLAN security typically only implement 802.1X access control with EAP-having transport level security (TLS) referred to as the 802.1X with EAP-TLS protocol for mutual authentication and performing a negotiation phase allowing for the granting of access based on Pre-Shared Keys (PSKs) or successful authentication through IEEE 802.1x exchanges. IEEE 802.11i provides a Robust Security Network (RSN) with two new protocols: the 4-Way Handshake; and the Group Key Handshake. These utilize the authentication services and port access control described in IEEE 802.1X to establish and exchange the appropriate cryptographic keys.

FIG. 1 shows example components and actions (100) of 802.1X with EAP-TLS protocol. A new network or device designated supplicant (101) requests access to the network through the authenticator (102), which is a gateway or hot spot to the secure local area network (SLAN). The authenticator (102) responds to the supplicant (101) with an EAP protocol request to identify itself. The supplicant (101) provides EAP protocol identification response to the authenticator (102) which is passed on to the authentication server (103) which generate the necessary security keys or challenge to be sent to the supplicant (101). The authenticator sends the key using EAP protocol to the supplicant who responds to the challenge which when checked and accepted by the authentication server (103) result in a successful connection between the supplicant and (101) and the SLAN through the authenticator. This process of secure connection using IEEE 802.11i provides for further security as explained based on the interaction between the access point (AP) which is the authenticator 202 and the supplicant station (STA) which is the client (201) using FIG. 2. The current IEEE 802.11i uses a four-way handshake to establish and ensure the secure and authenticated connection. The initial authentication process is carried out either using a pre-shared key (PSK), or following an EAP exchange through 802.1X (which generally requires the presence of an authentication server). This process ensures that the client station (STA) is authenticated with the access point (AP). After the PSK or 802.1X authentication, a shared secret key is generated, called the Pairwise Master Key (PMK). In a pre-shared-key network, the PSK is the PMK. If an 802.1X EAP exchange was carried out, the PMK is derived from the EAP parameters provided by the authentication server. The PMK is used by both the STA and AP to decrypt messages.

FIG. 2 shows an example sequence of actions 200 used to generate an additional secure key, the pair wise transient key (PTK), and also the Group Temporal key used for multicast and broadcast messages to provide further protection for the paired master key (PMK) under the 802.11i process.

A four-way handshake is used to establish the Pairwise Transient Key (PTK). The PTK is generated by concatenating the following attributes: PMK, AP nonce value (ANonce), STA nonce value (SNonce), AP MAC address, and STA MAC address. The product is then put through a pseudo random function.

The actual messages exchanged during the handshake for generation of PTK are depicted in FIG. 2 and explained below. All messages are sent as EAPOL-Key frames:

The AP (202) sends a nonce-value (ANonce) to the STA (201). The client STA (201) now has all the attributes to construct the PTK (215a) in the first step of the process S211.

The STA sends its own nonce-value (SNonce) to the AP together with a Message Integrity Code (MIC), including authentication, which is really a Message Authentication and Integrity Code (MAIC), in the second step of the process S212.

The AP now constructs the PTK (215b) and the GTK using the information received and sends the GTK and a sequence number together with another MIC. This sequence number will be used in the next multicast or broadcast frame, so that the receiving STA can perform basic replay detection in the third step of the process S213.

The STA sends a confirmation to the AP as the fourth step and completing the process S214.

BRIEF DESCRIPTION OF DRAWINGS

The embodiments herein are illustrated by way of example and not by way of limitation in the figures of the accompanying drawings in which like references indicate similar elements. It should be noted that references to "an" or "one" embodiment in this disclosure are not necessarily to the same embodiment, and they mean at least one. Also, in the interest of conciseness and reducing the total number of figures, a given figure may be used to illustrate the features of more than one embodiment, and not all elements in the figure may be required for a given embodiment.

DETAILED DESCRIPTION

Figure 1:
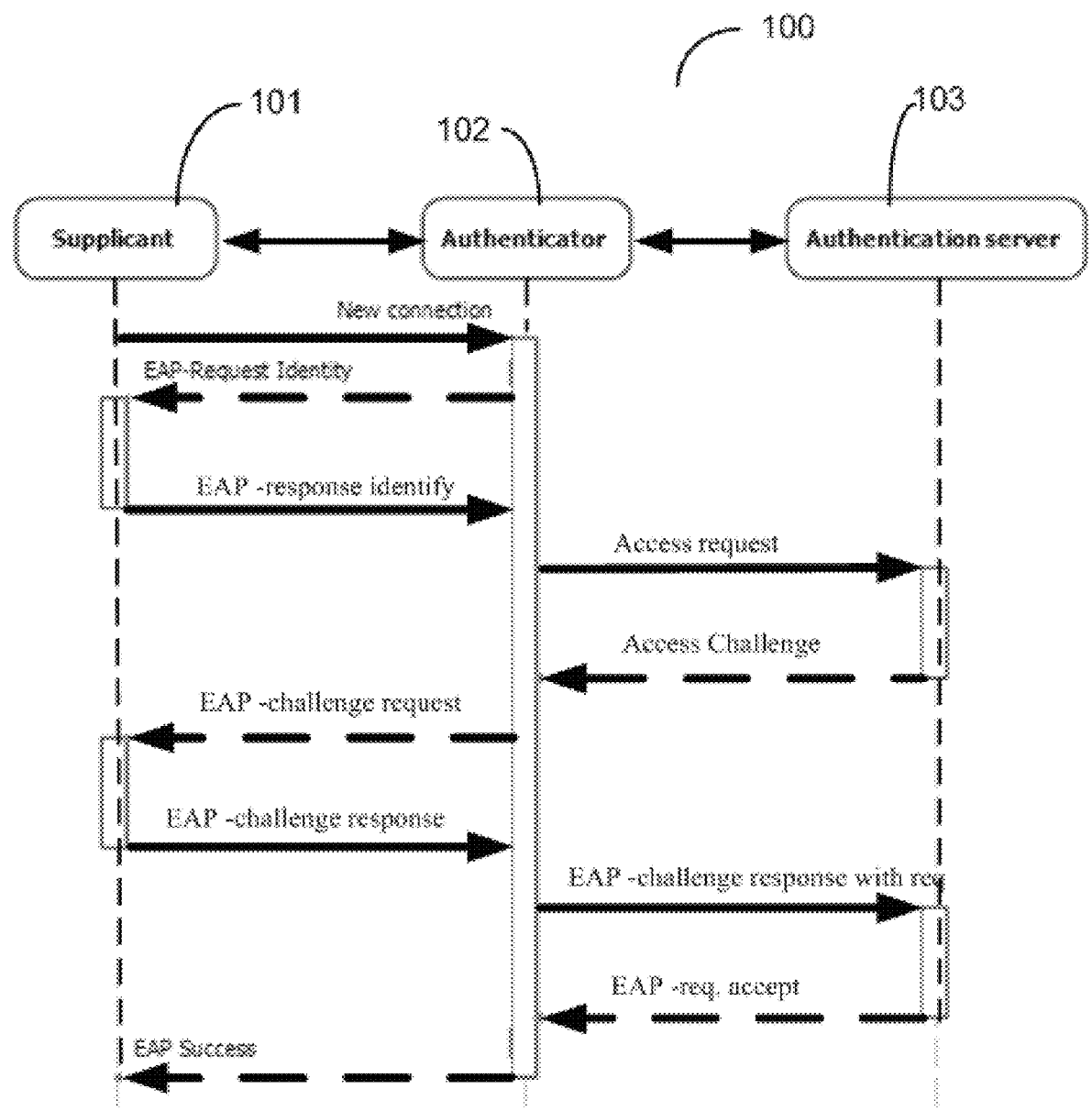
FIG. 1 illustrates a pictorial depiction 100 of conventional components and action of 802.1X with EAP-TLS protocol.
Figure 2:
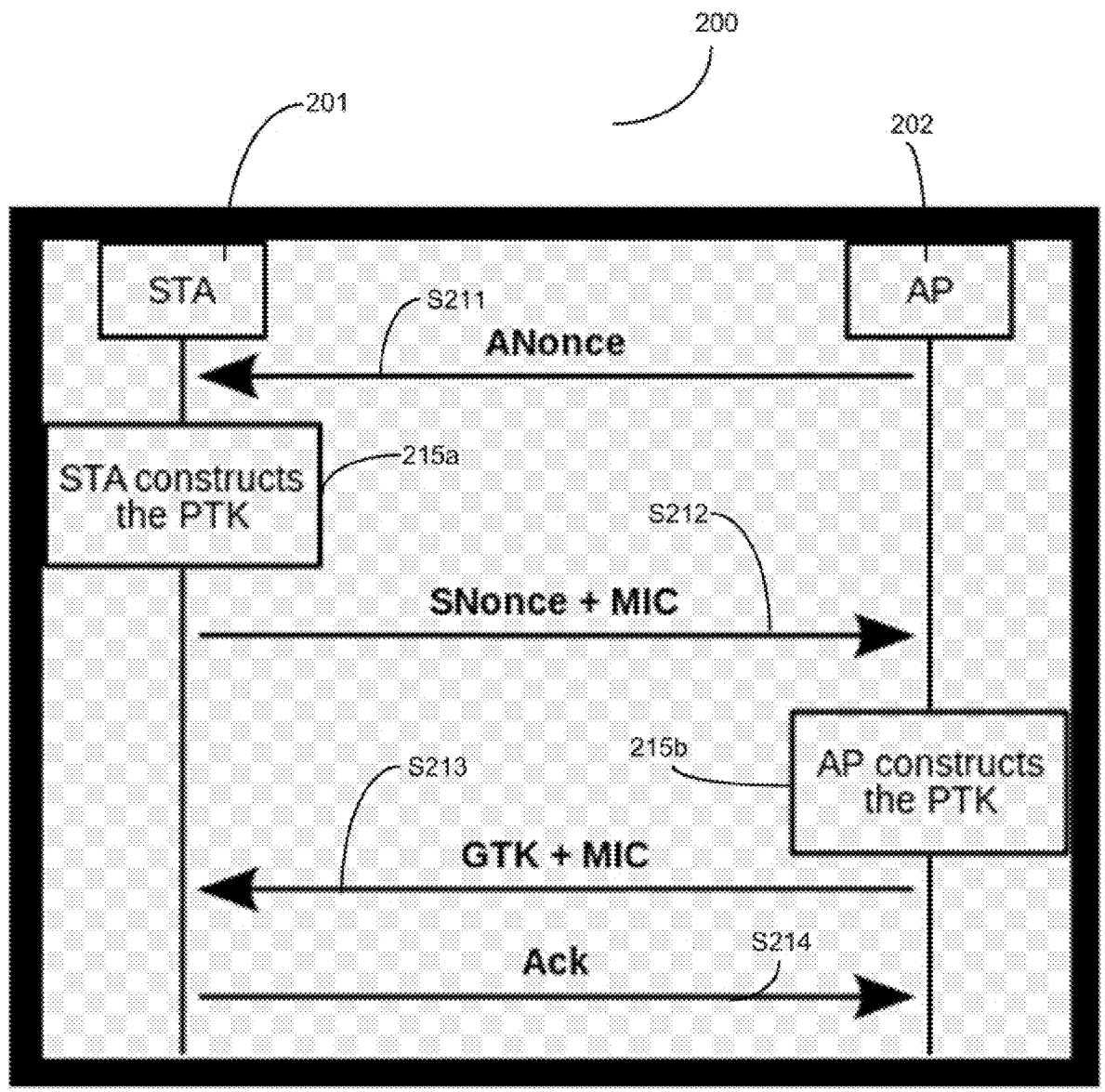
FIG. 2 illustrates a pictorial representation 200 of conventional actions used to generate an additional secure key, to provide protection for the paired master key (PMK) under the 802.11i process.

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, it is understood that embodiments disclosed herein may be practiced without these specific details. In certain instances, well-known or conventional details, such as circuits, structures, and techniques, are not described in order to provide a concise discussion of example embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment.

The IEEE 802.11 standard when implemented generally results in a secure and authenticated connection between the SLAN and the requesting network. However, the inventors herein have recognized that in the implementation of the IEEE 802.11i, the operational security of the new connecting network is typically not considered. This can result in the newly added devices and networks being cyber attackers posing as authentic devices and networks, or provide access to cyber attackers by not having the necessary security. Also by being within the secure LAN boundaries, these devices and networks, by themselves being unsecured, act as gateways for access by attackers making the secure LAN prone to cyber-attacks.

Hence it will be of great value to have a means of checking the operational security of devices and networks that are to be accepted as part of the secure LAN (SLAN) before the connection requests are accepted in the boundaries of the SLAN, in terms of network connectivity and accessibility, are extended to cover these new connected devices and networks.

The present disclosure provides a network and data security testing app for mobile devices (e.g., mobile phone, tablet devices), which are connected to the Internet via a wireless network. The app downloads and stores one or more network security or data loss test cases from a centralized server, which are then executed on the mobile device. For example, a test case attempts to access predetermined web pages through the wireless network and then determines whether access was granted. In another example, a test case attempts to transmit sensitive data through the network. Results of the test case are displayed on the mobile device and uploaded to the centralized server. The network and data security testing app also identifies whether access was granted to web pages hosting botnets, malicious web exploits, malicious web obfuscation, malicious iframe redirection, and malware files.

The disclosure herein provides for:

The collection and compilation of characteristic queries and response data from trusted networks comprising a plurality of elements, for generating a characterization query framework for new networks/device requesting connection.

Use of the compiled queries to extract responses from the network/device.

Using a cloud based security monitor for comparing, analyzing and identifying deviations from norm in the responses.

Use of a pseudo-network to emulate a real network so that the connection query responses between the pseudo network and the new network requesting connection can be extracted for analysis for classification of the operational security of the new network.

The analysis methods used above including data science approaches, correlation analysis and classification methods on a network level to classify the whole network rather than any single element of the network.

Determining the security level of the network to be connected from the result of the analysis of the deviations and enabling or refusing connection request based on the findings, or disconnecting the unapproved connection.

The embodiments herein include systems and methods for providing security to an enterprise local area network (LAN). Typically, the Enterprise LAN will have access and operational security established and exist as a monitored space, to prevent attacks by cyber attackers, making it a Secure LAN (SLAN). A typical enterprise network which forms the SLAN will have a plurality of elements, such as servers, mobile devices, storage devices, peripheral devices, display systems, other processing and communication elements connected as the secure network. The embodiments herein cover systems and methods for ensuring the security of the SLAN by pre-vetting and identifying the security characteristics and actions of any new wireless networks that are identified in the vicinity and that tries to connect to the SLAN. The disclosure herein provides the capability for identification and classification of IEEE 802.11 wireless networks by using a monitoring sensor system within and managed by a centralized cloud. The monitoring sensors interrogate the network mimicking the behavior of known platforms, such as an end-user's workstation or mobile device followed by random actions simulating a human person. The response characteristics of the wireless network including the behavior patterns relating to the LAN system and human behavior are collected. The security system uses methods of classification provided through analysis of the collected information using methods including data science approaches, correlation analysis, and machine learning classification methods to determine the pre-vetting result. The analysis results in a determination of a security classification of the newly detected wireless network. Based on this security classification which provides the operational security status of the network trying to connect to the secure LAN, decisions can be made to allow or disallow such connection request.

In one embodiment, for establishing connections normal access point (AP) of a network there is a negotiation process leading to connection. The AP typically broadcasts its information as data frames which include the extended service set identification (ESSID) of the network or its name, reachability address or the hardware address of the Wi-Fi chip set which is called the basic service set identification (BSSID) and capabilities (CAP). Any Wi-Fi client or station (STA) needing to connect to the network use this data to get connected. In the case of a SLAN the IEEE 802.11i security protocol is used by the STA and the AP to ensure a secure connection. The IEEE 802.11i security specification standard uses secure keys and EAP transfer protocols for achieving a secure connection between the STA and AP. As discussed previously the IEEE 802.11i standard does not typically check or ensure operational security of the STA to check if the connecting STA is an operationally secure device or SLAN and not vulnerable to attackers. By virtue of the arrangements disclosed herein, it is possible to correct the above-mentioned limitation of the 802.11i security standard.

Figure 3:
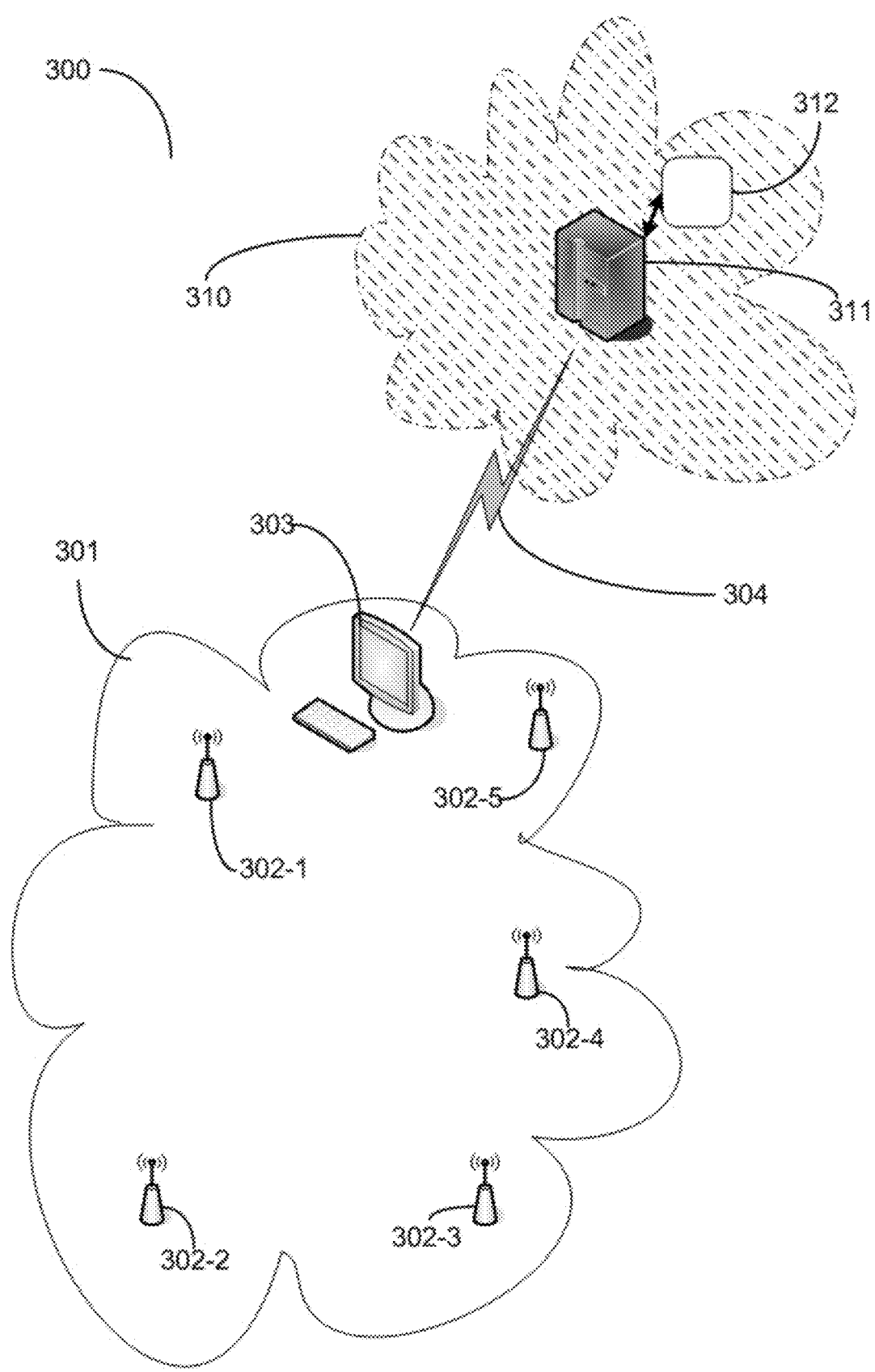
FIG. 3 illustrates an example block diagram 300 for explaining a secure local area network (SLAN) showing a sensor and a connected central console according an embodiment.

FIG. 3 is a block diagram for explaining an enterprise network that is a secure local area network (SLAN) 300 according to an embodiment herein. The enterprise network includes a plurality of elements as is well known and therefore not explicitly shown in FIG. 3, that may include servers, mobile devices, storage devices, peripheral and I/O devices, communication devices etc. connected together. It may also have a plurality of access points enabling the secure elements inside the SLAN to interact with the outside world. FIG. 3 shows the secure LAN (SLAN) (301) having a plurality of access points (AP) (302-x). In one embodiment, sensor (303) is associated with each of the APs (302-x) of the SLAN (301) and is linked to a central console (CC) (311) in the cloud (310). The sensor (303) is enabled to collect 802.11 Wi-Fi data frames that enable unique identification indicators of any networks, including devices, that connect to the AP (302-x). The collected data frames also comprise normal queries and responses between the SLAN (301) and the networks normally connecting to the SLAN (301) via the AP (302-x). The data and information collected by the sensor (303) are collated and delivered to the CC (311) in the cloud (310) over a communication link (304). Typically, the SLAN (301) uses a plurality of sensors (303) to ensure ease of data collection and transfer of the collected and collated information to the CC (311). The information and data received is stored in a historic database (312) in the cloud (310) which is continuously up dated by the CC (311) as new data is received. Further the CC (311) continuously analyzes the information and Data of interactions and develops a set of potential markers for classification of all the networks connecting to the SLAN (301). The classification uses system and human behavior and interactions received as part of the connection and handshake process and the set of queries and answers received, that point to potential markers during and after connection. These are analyzed to generate a classification of the requesting network, using data science approaches, correlation analysis and machine learning.

Figure 4:
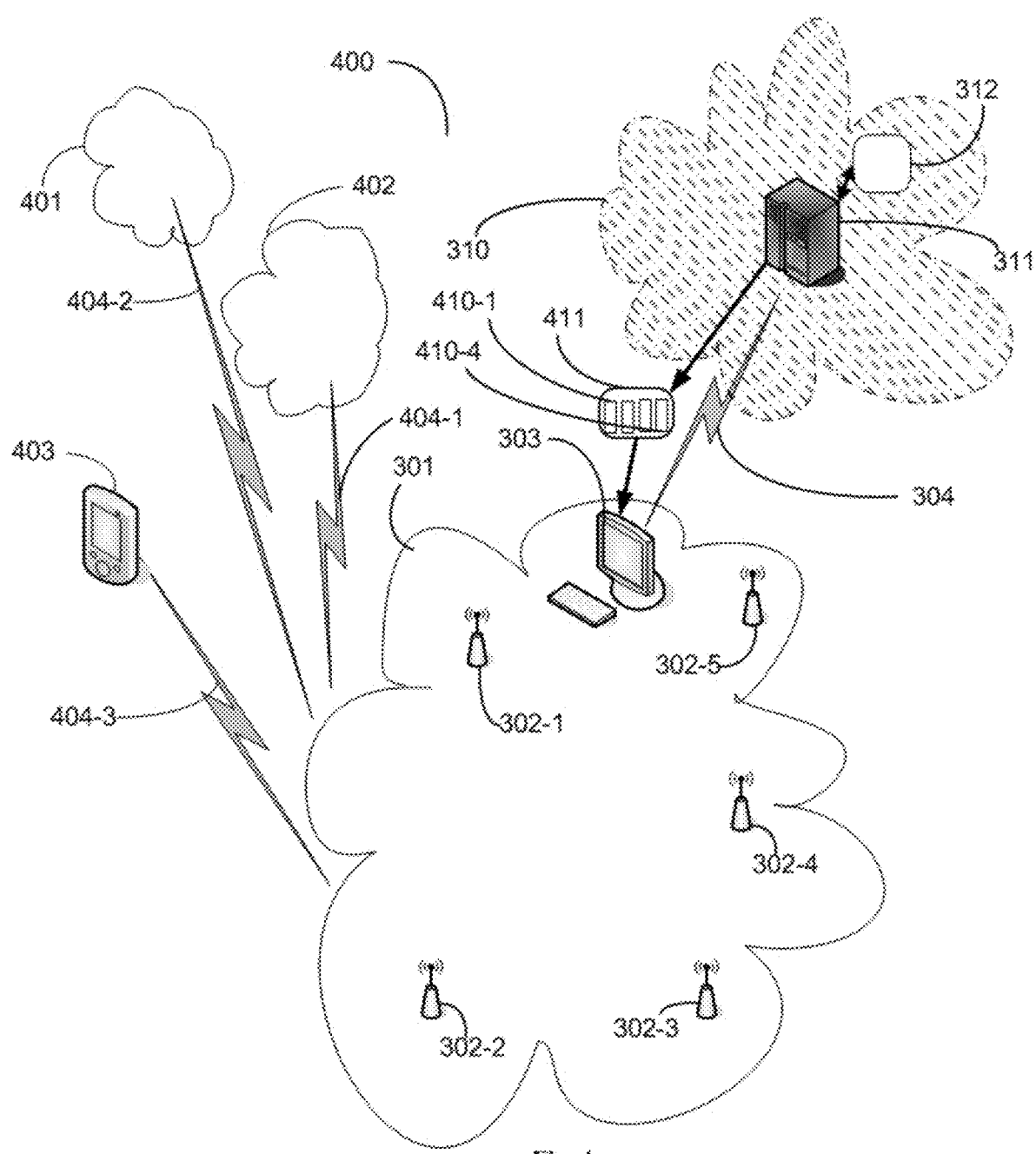
FIG. 4 illustrates an example block diagram 400 for explaining an SLAN connected to known secure networks and devices for collection and consolidation of data and information for classification of networks and generation of query packages according to an embodiment.

FIG. 4 shows the block diagram 400 for explaining connection of known secure networks, including devices, (401) (402) (403) connecting to the SLAN (301) via wireless 802.11 connections (404-1 to 404-3). The sensor (303) associated with and coupled to the CC (311), for example over communication link (304), collects the queries and responses during the regular connection of these secure networks (401 to 403). From the information and data of interactions collected from the known secure networks (401, 402) (403) connecting to the SLAN (301), the central console (311) generates query packages (410) of the regular command/result behaviors. The command/behaviors comprise various requests and responses from internet protocols such as Domain Name Server (DNS), Hypertext Transfer Protocol (HTTP), TCP/UDP services, and other consistent behavior tokens. Additional information collected and analyzed and included in packages comprise attributes of similar AP, such as 802.1X public certificates, honeypot canary data such as DNS hostnames, usernames and passwords, ESSID, and any additional data as-specified by third parties. These query/response packages (410-1 to 410-4) are saved in a query database (411) associated with the SLAN (301) for use by the sensor (303) during evaluation of the operational and peripheral security of any new networks as they try to engage with the SLAN (301).

Figure 5:
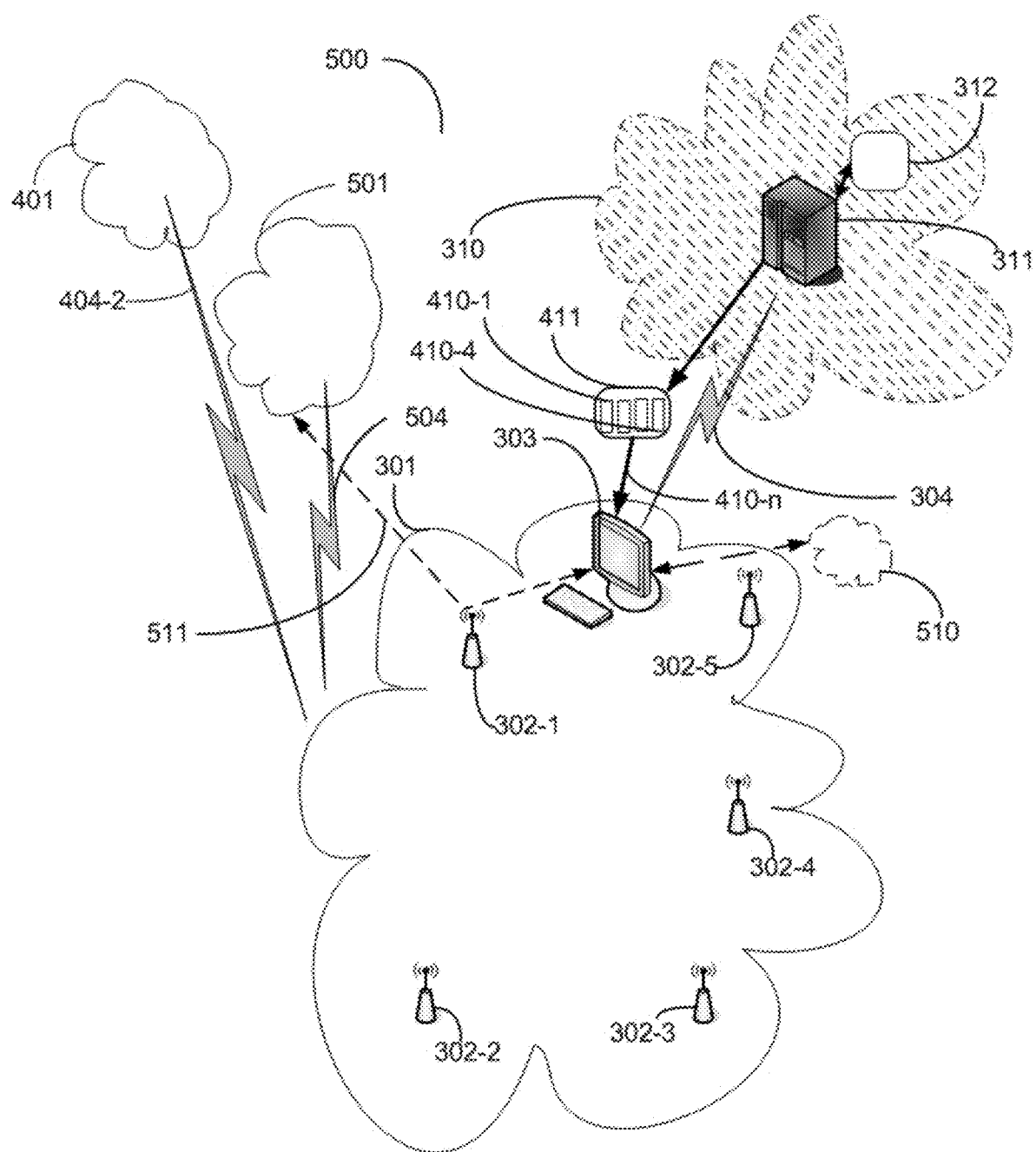
FIG. 5 illustrates an example block diagram 500 for explaining an SLAN connecting to a net-new network, the net-new network can be classified and queried to determine its operational security prior to enabling connectivity according to an embodiment.

FIG. 5 is a view for explaining conditions 500 when a new previously unknown network (501) tries to connect to an SLAN (e.g., 301) at an AP using 802.11 wireless connection (504). The connection request is identified by the sensor (303) and flagged. The initial information and data from the flagged net-new network (501) are collected by the sensor during the 802.11 handshake for secure connection and sent to the CC (311) for comparison to the historic data and identification of potential markers for classification. Once a classification of the new network (501) is established, the CC (311) checks the canned stored query/answers package (401 to 404) for the identified classification of the network, and based on the availability of the query package (410-$n$) in the database (411) the CC (311) chooses a canned query package (410-$n$) from the data base or generates a new query package (410-$n$) for the new classification to be provided to the sensor (303) to evaluate the operational security of the new network (501).

Once the query package (410-$n$) of requests and responses has been delivered to the sensor (303), the sensor (303) is requested to use the defined query package (410-$n$) to evaluate the new network (501). The sensor (303) with the help of the central console (311) establishes a pseudo-network with a client STA having a MAC address (510) (e.g., ac:bc:32:9f:4d:1c) that is similar to a known STA MAC address of network (401) in the neighborhood (such as ac:bc:32:9f:4d:0c). The generated STA MAC address (510) (e.g., ac:bc:32:9f:4d:1c) is used by the sensor (303) to engage with the new wireless network (501), to establish connectivity to it. In the case of networks protected by IEEE 802.1x standard protocol the sensor (303) attempts to establish login authentication using credentials generated by randomization or provided by third party data.

Once connectivity is established to the new network (501) by the sensor (303) additional addressing services such as TCP/IP DHCPv4, TCP/IP DHCPv6 or other addressing services are used to obtain network-based identifiers to allow connectivity to known services. The sensor (303) now uses the packaged query to interrogate the new network (501) and record the results. These received results (511) are passed on to the CC (311) as received or with additional modifications based on the information collected. Once the package of queries is completed and results (512) have been collected, they are reviewed by the CC (311) and compiled into a new query package, which is used to update the query packages in the database 411. The result of the review is used to decide if the requesting network (501) is operationally secure to be connected to the SLAN (301). The CC (311) also creates a security summary for the network (501) in the historic database for any further review and processing.

FIGS. 3-5 are merely examples of particular implementations and are merely intended to illustrate the types of components that may be present in various networks. Note that while the networks are illustrated with various components, it is not intended to represent any particular architecture or manner of interconnecting the components; as such details are not germane to embodiments herein. It will also be appreciated that networks which have fewer components or perhaps more components may also be used with embodiments herein.

Figure 6:
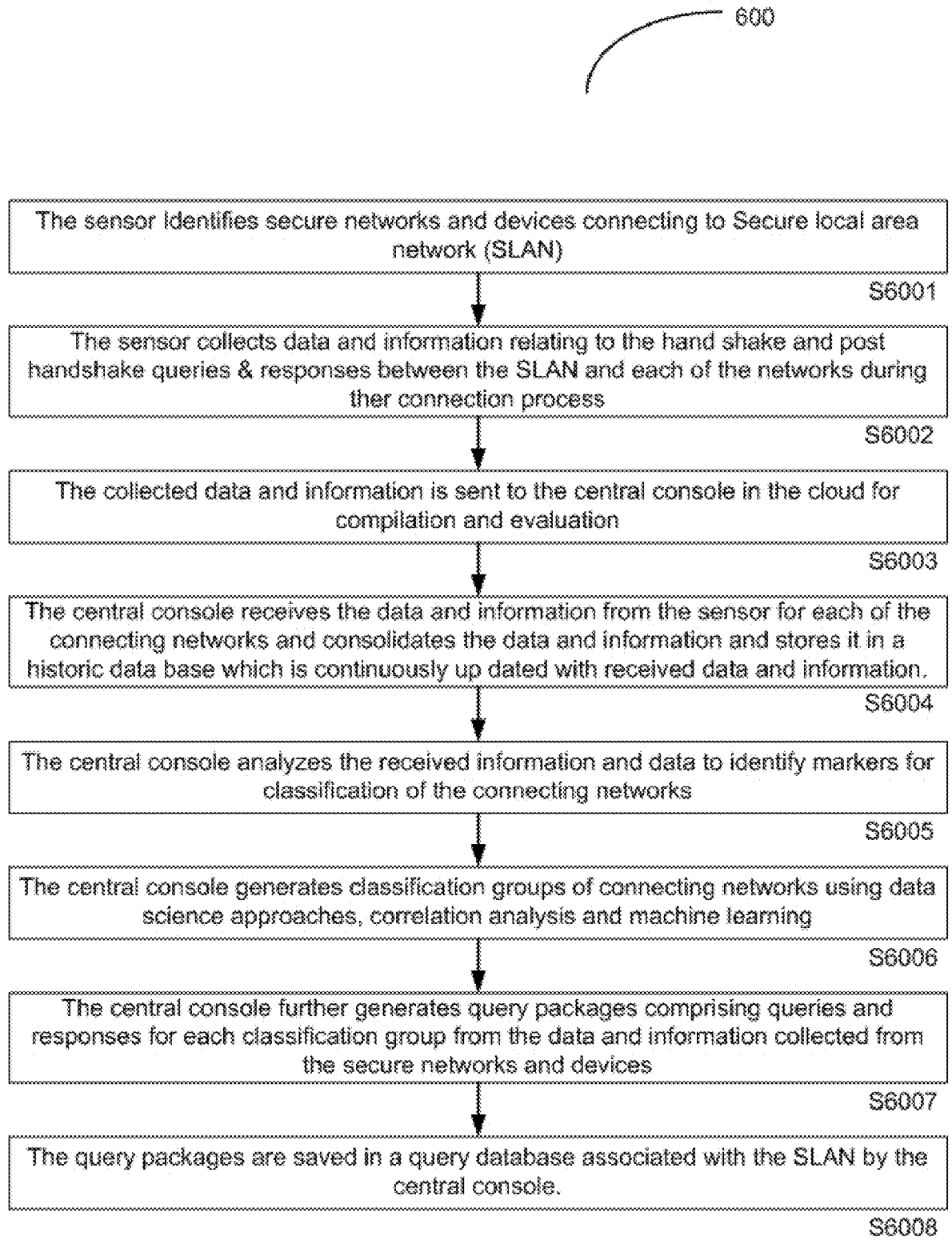
FIG. 6 illustrates an example flow chart for explaining generation of classifications of known connecting networks and generation and storage of query packages for each classification from data and information collected and consolidated according to an embodiment.

FIG. 6 is an example flow chart 600 for explaining classification of networks and generation of query packages suitable to interrogate the networks under each classification for their operational security. In this regard, the following embodiments may be described as a process 600, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a procedure, etc. Process 600 may be performed by processing logic that includes hardware (e.g., circuitry, dedicated logic, etc.), software (e.g., embodied on a non-transitory computer readable medium), or a combination thereof.

At block S6001, a sensor (303) identifies known secure networks (401 and 402) including devices (403) that connect using 802.11 wireless means to the access points (302-x) of the Secure local area network (SLAN) (301).

At block S6002, sensor (303) collects data and information relating to the hand shake and post handshake queries & responses between the SLAN (301) and each of the networks (401 to 403) during their connection process.

At block S6003, sensor (303) sends the collected data and information generated during the connection transaction between each of the networks (401 to 403) and the SLAN (301) to a central console (311) in the cloud (310) for compilation and evaluation.

At block S6004, central console (311) receives the data and information from the sensor (303) for each of the connecting networks (401 to 403) and consolidates the data and information, and stores it in a historic data base (312) which is continuously up dated with received data and information.

At block S6005, central console (311) analyzes the received information and data to identify markers for classification of the networks (401 to 403) connecting to the SLAN (301).

At block S6006, central console (311) using data science approaches, correlation analysis and machine learning, generates classification groups based on the markers identified, for networks (401 to 403) connecting to the SLAN (301).

At block S6007, central console (311) further generates query packages (410-1 to 410-4) comprising queries and responses for each classification group from the data and information collected from the secure networks (401 to 403) and the saved in the historic data and information saved in the historic database (312).

At block S6008, generated query packages (410-1 to 410-4) are saved in a query database (411) associated with the sensor (303) of the SLAN (301) by the central console (311), for conducting interrogation of any new network (501) that fall within the classifications already identified, for evaluating their operational security status as the new network tries to connect to the SLAN (301).

Figure 7:
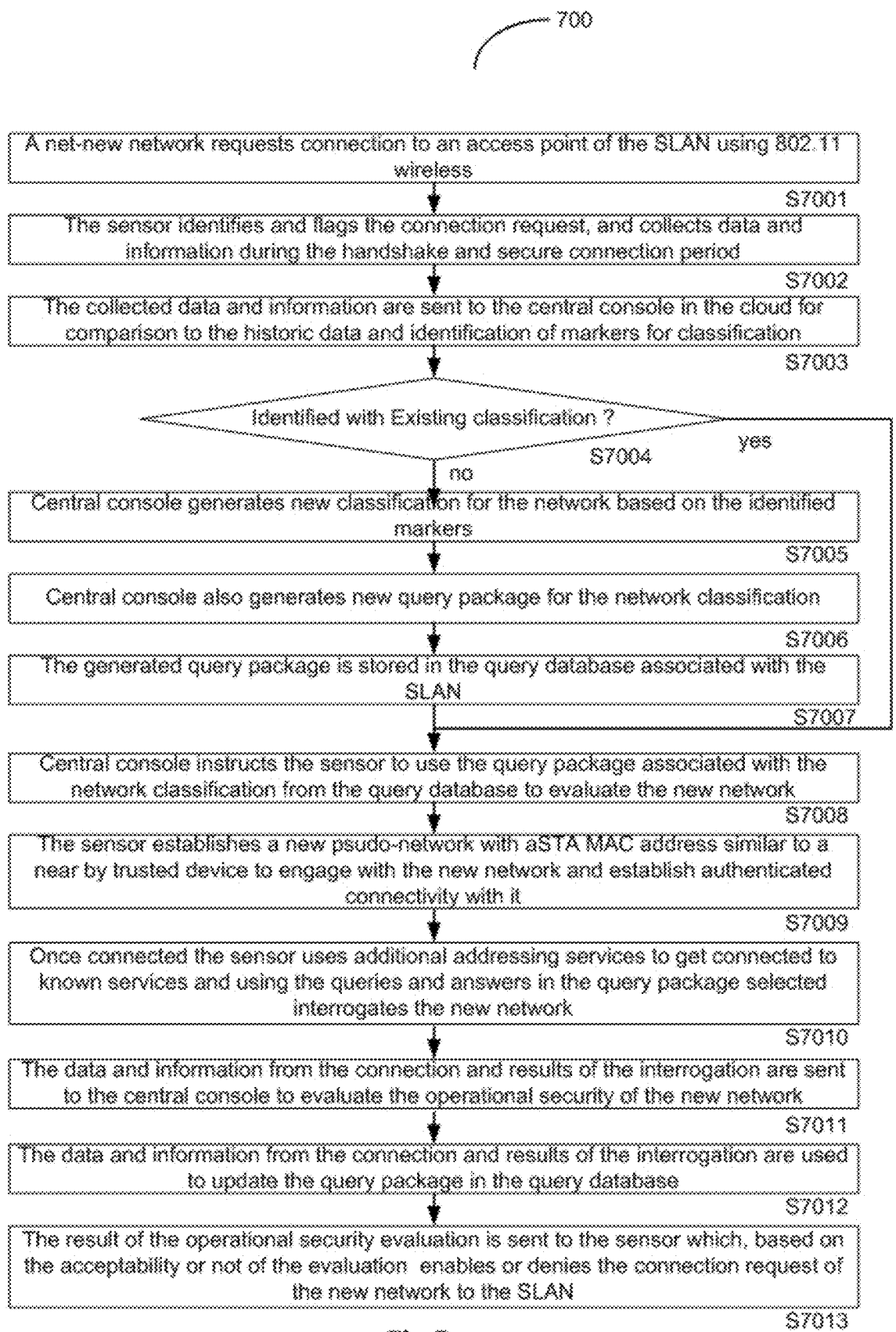
FIG. 7 illustrates an example flow chart for explaining classifying a new network requesting connection to the SLAN and choosing/generating a query package and using the same to evaluate the operational security of the new network prior to enabling connection to the SLAN according to an embodiment.

FIG. 7 is an example flow chart 700 for explaining identifying, classifying and interrogating a net-new network trying to connect to the SLAN by 802.11 wireless means, using query packages for determining the new network's operational security status; and based on the result allowing or denying the connection to the SLAN. In this regard, the following embodiments may be described as a process 700, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a procedure, etc. Process 700 may be performed by processing logic that includes hardware (e.g., circuitry, dedicated logic, etc.), software (e.g., embodied on a non-transitory computer readable medium), or a combination thereof.

At block S7001, a net-new network (501) requests connection through an access point (302-x) of the SLAN (301) using 802.11 wireless means.

At block S7002, sensor (303) identifies and flags the connection request, and collects data and information during the handshake and the secure pre-connection period.

At block S7003, the collected data and information are sent by the sensor (303) to the central console (311) in the cloud (310) for comparison to the historic data saved in the historical database (312) and identification of any available markers for classification of the new network (501).

At block S7004, the central console (311) checks the available markers for classification against stored classifications in the historic database (312) to see if the classification markers of the new network matches any existing classification. If the new network (501) is found to fall into an existing classification the next three steps are eliminated, but if the network is not identified by the central console (311) as falling into an existing classification, then the following three steps are initiated.

At block S7005, the central console generates a new classification for the network based on the identified markers from the data and information collected by the sensor (303).

At block S7006, based on the information and data collected by the sensor (303) and sent to the central console (311) and any relevant data in the historic data base (312) the central console (311) generates a new query package (410-n) for interrogation of the new network (501) and networks of the new classification.

At block S7007, the generated new query package (410-n) is stored in the query database (411) associated with the SLAN (301), referencing the new classification.

At block S7008, the central console (311) requests the sensor (303) to extract the query package (410-n) for the classification of the new network (510) from the query database (411) for evaluation of the operational security of the new network (501) requesting connection to the SLAN (301).

At block S7009, sensor (303) establishes a new pseudo-network (510) with a STA MAC address resembling that of a nearby trusted network (401) to directly engage with the new network (501) and establishes an authenticated connectivity with it, with handshake and secure connectivity.

At block S7010, sensor (303) once direct connection is established uses additional addressing services to get connected to known services, and using the queries and answers in the selected query package (410-*n*) interrogates the new network.

At block S7011, the additional data and information from the connection to the new network (501) and results of the interrogation are collected by the central console sensor (303) and sent to the central console (311) to evaluate the operational security of the new network.

At block S7012, the data and information collected from the new connection process to the pseudo-network (510) and the results of the interrogation are used by the central console (311) to update the query package (410-*n*) saved in the query database (411) for the new classification.

At block S7013, the result of the operational security evaluation is sent by the central console (311) to the sensor (303) of the SLAN 9301) which, based on the acceptability or not of the evaluation enables or denies the connection request of the new network (501) to the SLAN (301).

The processes described herein (e.g., processes 600 and 700) are not limited to the specific examples described. For example, processes 600 and 700 are not limited to the specific processing orders of FIGS. 6 and 7, respectively. Rather, any of the processing blocks of these figures may be re-ordered, combined or removed, performed in parallel or in serial, as necessary, to achieve the results set forth above. The processing blocks (for example, in the process 600 and the process 700) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate. Further, processes 600 and 700 can be implemented in any combination hardware devices and software components.

The processes described herein (e.g., process 600 and process 700) are not limited to use with the hardware and software of FIGS. 3 to 5; they may find applicability in any computing or processing environment and with any type of machine or set of machines that is capable of running a computer program. The processes described herein may be implemented in hardware, software (including computer code stored on a computer-readable medium, such as a hard drive or system memory), or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

Embodiments of the NPS and NPPS may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable storage medium that is readable by a general or special purpose programmable computer for configuring and operating the computer when the non-transitory machine-readable medium is read by the computer to perform the processes described herein.

For example, the systems and processes described herein may also be implemented as a non-transitory machine-readable storage medium having stored thereon instructions which program a processor to perform some or all of the operations described above. The non-transitory machine-readable storage medium may be configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se. In other embodiments, some of these operations might be performed by specific hardware components that contain hardwired logic. Those operations might alternatively be performed by any combination of programmable computer components and fixed hardware circuit components.

The terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing or encoding a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, and optical and magnetic media, or any other non-transitory machine-readable medium.

While the present disclosure has been described in terms of embodiments, those of ordinary skill in the art will recognize that the invention is not limited to the embodiments described, but can be practiced with modification and alteration within the spirit and scope of the appended claims. The description is thus to be regarded as illustrative instead of limiting. There are numerous other variations to different aspects of the invention described above, which in the interest of conciseness have not been provided in detail. Accordingly, other embodiments are within the scope of the claims.

The invention claimed is:

1. A system comprising:
a sensor configured to identify and flag a connection request from an unknown network to at least one access point of a secure local area network (SLAN), establish a pseudo-network and engage with the unknown network to establish an authenticated connection between the unknown network and the pseudo-network, and interrogate the unknown network using an extracted query package to collect data and information regarding the unknown network and interactions between the unknown network and the pseudo-network, wherein the extracted query package comprises queries and expected responses from a query database; and a central console coupled to the sensor and configured to identify at least one marker for classification of the unknown network based on a connection transaction by the unknown network;

check in a historic database for the identified at least one marker to determine whether the identified at least one marker matches a classification from a plurality of classifications stored in the historic database;

in response to determining that the identified at least one marker matches the classification, extract the query package, wherein the query package is associated with the classification and the classification comprises the at least one marker, use the collected data and information to evaluate an operational security status of the unknown network, and transmit a result of the evaluation to the sensor;

wherein, based on the result of the evaluation, the sensor enables or denies the connection request of the unknown network to the SLAN.

2. The system of claim 1, wherein when the central console determines that the identified at least one marker does not match the classification, the central console is further configured to generate a new classification and an associated new query package for interrogation of the unknown network based on the collected data and information regarding the unknown network and the interactions between the unknown network and the pseudo-network and historic data stored in the historic database, and store the identified at least one marker, the new classification in the historic database, and the associated query package in the query database.

3. The system of claim 1, wherein the central console is further configured to compare the identified at least one marker against a plurality of existing classifications stored in the historic database to determine whether the identified at least one marker falls within one of the plurality of existing classifications stored in the historic database, and when the identified at least one marker is not determined to fall within one of the plurality of existing classifications, the central console is further configured to generate a new classification based on the identified at least one marker and the collected data and information regarding the unknown network.

4. The system of claim 2, wherein the sensor is configured to:

identify known secure networks including one or more devices that securely connect using 802.11 wireless connection to the at least one access point of the SLAN;

collect data and information regarding a handshake, post handshake queries, and responses between the SLAN and the known secure networks during a connection transaction between the one or more devices and the SLAN to the central console for compilation and evaluation of the existing classifications; and send the collected data and information regarding the handshake, the post handshake queries, and responses between the SLAN and the known secure networks during the connection transaction between the one or more devices and the SLAN to the central console.

5. The system of claim 2, wherein to generate the new query package, the central console is configured to receive the collected data and information from the sensor and analyze the collected information and data to identify the at least one marker for classification of the unknown network;

consolidate the collected data and information, and store the consolidated, collected data and information in the historic database;

use data science, correlation analysis and machine learning to generate at least one classification group based on the identified at least one marker;

generate the new query package including queries and expected responses for each classification group from the collected data and information and the historic data stored in the historic database; and store the new query package in the query database for evaluating operational security status of other unknown networks that request connection to the SLAN.

6. The system of claim 1, wherein the pseudo-network has a STA MAC address resembling a STA MAC address of a known secure local area network (KSLAN).

7. The system of claim 6, wherein the sensor interrogates the unknown network by mimicking behavior of known platforms and random actions simulating a human behavior within the pseudo-network.

8. The system of claim 7, wherein the collected data and information comprise response characteristics of the unknown network including behavior patterns relating to the KSLAN and the human behavior, and the sensor collects the data and information while establishing a handshake and the authenticated connection between the unknown network and the pseudo-network.

9. A method for assessing operational security of an unknown network requesting a connection to an access point of a secure local area network (SLAN), the method comprising:

identifying and flagging a connection request from the unknown network to the SLAN, wherein the unknown network comprises one or more devices;

collecting data and information regarding the unknown network during a connection transaction and providing the collected data and information to a central console;

identifying at least one marker of the unknown network and checking in a historic database for the identified at least one marker to establish a classification of the unknown network, wherein the historic database comprises a plurality of classifications;

using, by the central console, the at least one marker to extract a query package for the established classification of the unknown network from a query database to evaluate an operational security status of the unknown network, the query package including queries and expected responses;

establishing a pseudo-network to engage with the unknown network;
establishing an authenticated connection between the pseudo-network and the unknown network;
collecting data and information regarding interactions between the unknown network and the pseudo-network using the query package;
evaluating the operational security status of the unknown network using the collected data and information regarding the unknown network and the collected data and information regarding the interactions between the unknown network and the pseudo-network;
based on a result of the evaluation, enabling or denying the connection request of the unknown network to the SLAN.

10. The method of claim 9, further comprising:
checking and determining, by the central console, whether the identified at least one marker of the unknown network falls within one of a plurality of existing classifications stored in a historic database; and
in response to determining that the identified at least one marker is not within one of the plurality of existing classifications,
generating a new classification associated with the identified at least one marker,
storing the new classification in the historic database,
generating a new query package for interrogation of the unknown network based on the data and information, collected during the connection transaction, regarding the unknown network and historic data stored in the historic database, and
storing the new query package in the query database.

11. The method of claim 10, wherein
determining whether the identified at least one marker for classification of the unknown network falls within one of the plurality of existing classifications stored in the historic database comprises comparing the identified at least one marker against the plurality of existing classifications stored in the historic database.

12. The method of claim 11, further comprising:
identifying known secure networks including one or more devices that connect using 802.11 wireless connection to the access point of the SLAN;
collecting data and information regarding a hand-shake, post handshake queries, and responses between the SLAN and the known secure networks during a connection transaction between the one or more devices and the SLAN to a central console for compilation and evaluation of the existing classifications; and
evaluating the collected data and information regarding the hand-shake, the post handshake queries, and the responses between the SLAN and the known secure networks during the connection transaction to confirm the operational security status.

13. The method of claim 10, wherein generating the new query package comprises:
receiving the collected data and information,
consolidating the collected data and information, and storing the consolidated, collected and data and information in the historic database to update the historic database,
analyzing the consolidated, collected data and information to identify the at least one marker for classification of the unknown network,
using data science, correlation analysis and machine learning to generate at least one classification group based on the identified at least one marker,
generating the new query package including queries and expected responses for each classification group from the collected data and information and the historic data stored in the historic database, and
storing the new query package in the query database for conducting interrogation of another unknown network that falls within the one of the plurality of existing classifications, and for evaluating operational security status of the other unknown network that requests connection to the SLAN.

14. The method of claim 9, wherein the pseudo-network has a STA MAC address emulating a known secure network.

15. The method of claim 9, wherein the unknown network is interrogated by mimicking behavior of known platforms and random actions simulating a human behavior.

16. The method of claim 15, wherein the collected data and information comprise response characteristics of the unknown network that include behavior patterns relating to the interactions of the unknown network with the SLAN and the random actions simulating the human behavior.

17. A non-transitory computer-readable storage medium storing computer-executable instructions, the instructions when executed by a machine causing the machine to execute a process, the process comprising:
identifying and flagging a connection request from an unknown network to at least one access point of a secured local area network (SLAN) to collect data and information regarding the unknown network during a connection transaction and provide the collected data and information to a central console, wherein the at least one access point comprises a sensor;
identifying, by the central console, at least one marker for classification of the unknown network;
extracting, from a query database, a query package for the classification of the unknown network, the query package including queries and expected responses for interrogating the unknown network;
establishing a pseudo-network emulating a known secure network to establish an authenticated connection between the unknown network and the pseudo-network;
interrogating the unknown network using the query package;
collecting data and information regarding an interaction of the unknown network with the pseudo-network;
using the collected data and information regarding the interaction of the unknown network with the pseudo-network including results of the interrogation to evaluate an operational security status of the unknown network; and
transmitting a result of the evaluation of the operational security status of the unknown network to the sensor;
wherein the sensor, based on the result of the evaluation, enables or denies the connection request of the unknown network to the at least one access point of the SLAN.

18. The non-transitory computer-readable storage medium of claim 17, wherein the process further comprises:
in response to determining that the identified at least one marker for classification of the unknown network does not fall within one of a plurality of existing classifications stored in a historic database based on the data and information collected during the connection transaction regarding the unknown network, and historic data stored in the historic database, generating a new classification and a new query package corresponding to the identified at least one marker, for interrogation of the unknown network;
storing the new classification in the historic database; and
storing the new query package in the query database.

19. The non-transitory computer-readable storage medium of claim 17, wherein the process further comprises:
determining whether the identified at least one marker for classification of the unknown network falls within one of the plurality of existing classifications stored in a historic database by comparing the identified at least one marker against the plurality of existing classifications stored in the historic database.

20. The non-transitory computer-readable storage medium of claim 18, wherein the process further comprises:
when the identified at least one marker does not fall within one of the plurality of existing classifications, generating a new classification based on the at least one identified marker and the collected data and information regarding the unknown network.

* * * * *